United States Patent [19]
Orlov et al.

[11] 3,895,446
[45] July 22, 1975

[54] DEVICE FOR MEASURING SURFACE PROFILES

[76] Inventors: Petr Nikolaevich Orlov, ulitsa M. Ulyanovoi, 21, korpus 2, kv. 54; Jury Ivanovich Nesterov, ulitsa Moldagulovoi 28, korpus 4, kv. 19, both of Moscow; Vasily Yakovlevich Kudashov, ulitsa Komosomolskaya, 22E, kv. 30; Alexandr Vasilievich Zimnyakov, ulitsa Schelkovichnaya, 184, kv. 19, both of Saratov, all of U.S.S.R.

[22] Filed: Dec. 3, 1973

[21] Appl. No.: 420,896

[52] U.S. Cl. .......................... 33/174 L; 33/174 PA
[51] Int. Cl. .......................... G01b 7/02; G01b 7/28
[58] Field of Search ........ 33/174 R, 174 PA, 174 L, 33/176

[56] References Cited
UNITED STATES PATENTS

| | | |
|---|---|---|
| 3,110,112 | 11/1963 | Dalgleish .......................... 33/174 L |
| 3,557,462 | 1/1971 | Kiewicz et al. ..................... 33/174 L |
| 3,755,908 | 9/1973 | VerNooy ............................ 33/174 R |

*Primary Examiner*—Richard E. Aegerter
*Assistant Examiner*—Richard R. Stearns
*Attorney, Agent, or Firm*—Holman & Stern

[57] ABSTRACT

A device for measuring the wear of the working surface of a finishing lap under workshop conditions. The device has a plurality of measuring elements for measuring linear dimensions, which include mobile members afixed to a flexible wrapper which at the moment of measuring is held in contact with the surface to be tested. At the moment of measurement sensitive pick up units of the measuring elements which are fixed relative to the surface being measured pick up measuring signals which correspond to the position of each of the mobile members held in contact with the surface being tested.

6 Claims, 2 Drawing Figures

DEVICE FOR MEASURING SURFACE PROFILES

BACKGROUND OF THE INVENTION

The present invention relates to devices for measuring dimensions and/or shape of machine and machine tool components and, more particularly, to devices for evaluating dimensional deviations in surface profiles of a component both while moving and stationary.

In particular, the present invention relates to a device for testing the wear of working surfaces of the laps utilised for lapping-out precision surfaces of large-size components directly under workshop conditions.

As is known, while the components are being mechanically machined, the working surfaces of the tool are inevitably worn out, thereby badly affecting the accuracy of machining. To stabilise the accuracy of machining in time, it is necessary to periodically conform the modes of machining with the condition of the working surfaces of the tool.

The method of mechanical abrasive lapping-out of the precision surfaces of components wherein the condition of the working surfaces of the laps, e.g. maintaining the flatness of the surface, determines the accuracy of machining the machine and instrument components, is gaining an ever growing application among finishing operations.

At the present time there is actually no device that can test the working surfaces of the laps.

In practice, use is generally made for these purposes of precision rulers equipped with an indicator device having a gauge tip.

The most perfect of these is a ruler which, taking advantage of an induction pick-up, that is automatically moved on the ruler, permits the profile of the working surface on millimetre paper to the required scale to be recorded.

A disadvantage of such prior art devices consists in that they are impossible to utilise for measuring the profile of the tool working surface in the process of lapping out components directly under workshop conditions.

SUMMARY OF THE INVENTION

An object of the present invention is, therefore, to provide a device for measuring the profile of the component surface both during the movement of the component or when it is stationary.

Another object of the present invention is to provide a device for measuring the profile of the component surface, suitable for testing the wear of the working surface of the lap directly under workshop conditions.

Still another object of the present invention is to provide such a device which is comparatively simple in design and reliable in operation, for measuring the profile of the component surface, which can be adapted to be utilised as a pick-up for the system of automatic stabilisation of the accuracy of machining machine and instrument components in the process of their lapping-out.

Provision of such a device involves a number of difficulties, for example, the availability of abrasive suspension on the tested surface, vibration of laps, etc. This device should meet the following requirements. The relationship between the output value and the input value should be unambiguous (inavailability of hysteresis). It should possess a high selectivity. The pick-up should react only to that value which is being measured. A minimum variation of characteristics under the effect of external factors (temperature, vibration, etc.) should be maintained. A definite kind of relationship should exist between the output and input values, preferably a linear one. There should be a high sensitivity and stability of the measurement characteristics in time, and purpose of action should be provided, i.e. no effect of the load in the output circuit of the pick-up on the mode of the input circuit, certain dynamic characteristics (minimal constant of time) and, lastly, a high overload capacity (maximum allowable ratio of the input value to the rated value) and stability to mechanical, thermal, electrical and other overloads.

Thus, an object of the present invention is to eliminate these and other disadvantages and to provide a device for measuring the profile of a component surface, which is suitable for evaluating the amount of wear of the lap working surface directly under workshop conditions when lapping out precision surfaces of workpieces and which can be included as a pick-up in the system for automatically maintaining lapping-out accuracy.

The principal object of the present invention is to provide a device adapted for a simultaneous evaluation of the deviations from the predetermined dimension on any section of the tested surface of a component (lap) both in the process of its movement; and when it is stationary irrespective of the abrasive or lubrication fluid available on the tested surface and its vibrations.

To accomplish these and other objects, the device embodied in the present invention designed to measure the profiles of a component surface comprises a group of elements for measuring linear dimensions located over the tested surface of the component in predetermined points, and a flexible wrapper capable of tightly enveloping the surface of the component on the tested sections, with each of the measuring elements being adapted to determine the distance to the section of the flexible wrapper located beneath when it is pressed to the surface of the component.

Such an embodiment makes it possible to carry out measurements simultaneously and practically in any predetermined area of the component surface to be tested, and since the measurements are carried out up to the location of the flexible wrapper, by selecting the material and design of the flexible wrapper making it more or less flexible and pliable, it becomes possible to measure complex configurations of the components.

According to one embodiment of the present invention each measuring element incorporates a sensitive unit for picking up the measuring signal, and a mobile member whose position with respect to the sensitive unit determines the value of the measuring signal, with all mobile members of the measuring elements being connected to the common flexible wrapper.

Such a modification as mentioned makes it possible to use diverse progressive methods of measuring dimensions, including contactless methods (pneumatic, induction, capacitance, etc.) due to the fact that it suffices to measure the value of movement of each individual mobile member of the measuring element connected to the common wrapper with respect to the respective sensitive unit of the measuring element which can be installed stationary. This is also of convenience from the point of view of the design embodiment of the device.

According to another embodiment of the present invention which does not exclude the application of the above modification, the flexible wrapper represents a band normally located under the surface to be tested and incorporating contacts which cause the sensitive units of the measuring elements which are induction pick-ups of dimension to react.

In accordance with the following modification of the present invention, the measuring device incorporates an appliance for pressing the flexible band to the surface of the tested component at the moment of measuring and taking the band to the initial position. Such a modification makes it possible to measure the configuration of the components both in the process of their movement and when they are stationary. It is especially convenient in systems for testing actively the dimensions of mechanical engineering products, when it is necessary in the process of machining to have information on the current value of the dimensions of the machined component or on the amount and character of wear of the working tool.

Still another modification of the present invention consists in that the device incorporates a chamber with an elastic bottom represented by the flexible band which is also the inlet for the compressed medium supplied to the chamber for pressing its bottom, the band, to the component. Such a design makes it possible to bring rapidly and conveniently the measuring instrument of the present invention in contact with the tested surface and take the instrument to the initial position after having completed the measurement, thereby enabling the component to be tested in motion. Finally, it is expedient according to the invention, that the flexible wrapper be fabricated from a rubber band with brass foil glued on both sides of the stretched band.

Such an embodiment provides optimal elastic qualities and stability of the instrument flexible wrapper.

BRIEF DESCRIPTION OF THE DRAWINGS

These and other objects and advantages of the present invention will become more apparent from the following detailed description of the device embodied in the present invention and the accompanying drawings, wherein.

DETAILED DESCRIPTION OF PREFERRED EMBODIMENTS

Let us consider the application of the present device for testing the radial profile of the working surface of the lap of a finishing machine tool in the process of finishing components.

The accuracy of the geometrical shape of the component surface machined on the tool depends on the condition of the working surface of the lap. In the process of mechanical lapping out the working surface of the lap and the surface of the component being machined are being worn out. The shape of the initial (not worn-out) surface of the lap represents a plane with deviations from flatness within 0.001–0.005 mm for laps of 500+700 mm-dia. The shape of the worn-out working surface of the lap is determined by the law of distributing mechanical work spent on the wear over its surface and depends on the kinematics of the working members of the operating mechanism of the finishing tool, production and dynamic parameters of a specific process of lapping out accomplished on the present tool. Since the worn-out working surface of the lap is symmetrical with respect to the rotational axis of the lap, to evaluate the surface, it is sufficient to have information on the profile of the working surface of the lap in its radial section. In order to obtain the required geometrical shape of the machined surfaces of components, it is necessary to select automatically the kinematic adjustment mode of the tool by means of a special device or by the operator himself proceeding from the condition of the working surface of the lap.

Figure 1:
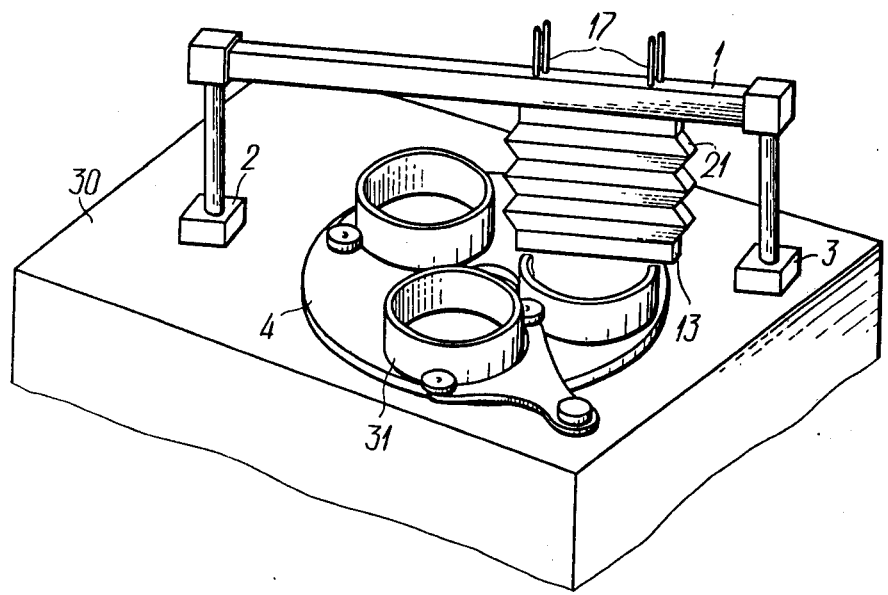
FIG. 1 represents diagrammatically a general view of the device, according to the invention, in the position of measuring the surface of the lap under workshop conditions.
Figure 2:
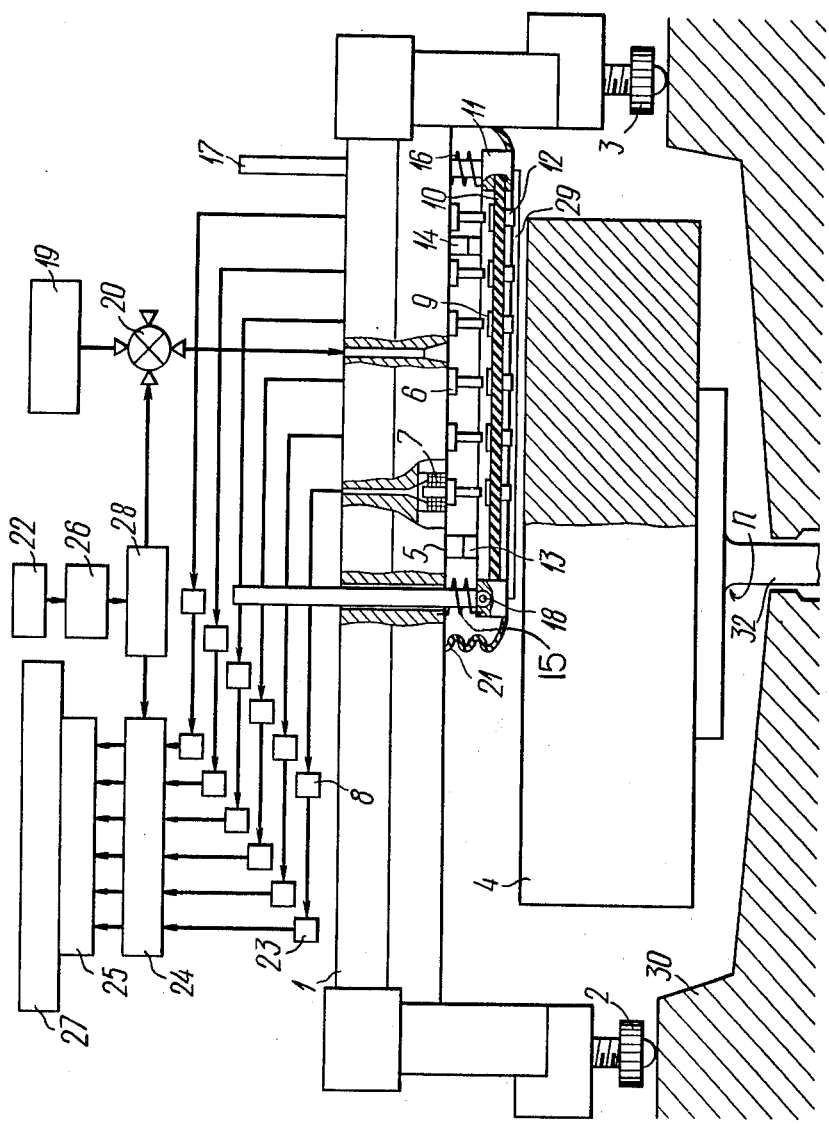
FIG. 2 represents a basic diagram of the device for measuring the profiles of surfaces, according to the invention.

The device for measuring the profile of a surface comprises a base element constructed in the form of an accurate (measuring) ruler 1 (FIGS. 1, 2). The ruler 1 having the form of a flat rod whose surface directed to the tested surface represents a plane with deviations from flatness within 0.001+0.002 mm is extended by means of adjustable supports 2, 3 in parallel to the initial plane of the working surface of the lap 4 and represents the base surface 5. The adjustable supports 2, 3 are located outside the working surface of the lap 4 thus allowing movement of the ruler 1 perpendicular to the plane of the initial surface of the lap 4 within the maximum allowable wear range. Uniformly located on the base surface 5 of the ruler 1 are sensitive units of devices for measuring the deviations of linear dimensions which consist of cores 6 with coils 7 of induction pick-ups 8. The butt of each core 6 facing the tested surface of the lap 4 is a finished flat surface whose deviations from the flatness are within 0.5–1 mu m and which extends parallel to the base surface 5 of the ruler 1 with an accuracy of 0.5–1 mu m. Practically, the tested value of deviations from the flatness of the working surface of the lap 4 as a result of its wear in the process of finishing lies within 20 –1.5 mm. The induction pick-up used in this case has a linear output characteristic within the mentioned range. This is accomplished by a differential switching-off of its coils 7, and by selecting the value of feeding voltage and the value of resistance of the coils 7. The minimum number of pick-ups 8 required is three, the maximum amount being determined by the dimensions of the lap 4 and the pick-up proper, as well as by the required accuracy of measurement. In the present case use is made of six pick-ups 8. The armatures 9 of the pick-ups 8 are located on a flexible wrapper 10. The flexible wrapper 10 consists of a rubber pliable base 1.5–2 mm thick whereon a brass foil 20+30 mu m is glued on both sides of the stretched-out base. The flexible wrapper 10 when extended is fastened between the butts of two rectangular frames 11. On one side of the flexible wrapper in accordance with the arrangement of the pick-ups 8, the armatures 9 of the pick-ups 8 are glued which armatures are flat bodies 2.5 mm high, having a contour corresponding to the contour of the butt surface of the cores of the induction pick-up 8 and are fabricated from the same material as the cores 6 of the pick-up 8. On the other side of the rubber wrapper under each armature 9 hard-alloy pivots 12 are glued consisting of cylindrical bodies of 3 mm-diameter and 5 mm-height with a height tolerance of 0.5 mu m. The pivots are glued in such a manner that the free butt surfaces of the armatures 9 and the pivots 12 lie in the appropriate planes that are parallel to the free butt surfaces of the frame 11 with deviations when assembled from flatness and parallelism less than 1 mu m. Located on the upper butt surface of the frame 11 facing the base surface 5 of the ruler 1 are the fixing elements 13, 14 representing bodies of cylindrical shape having a diameter of 10 mm and a height tolerance with respect to the butt surface of the frame 11 equal to 0.001 mm. In the initial position with the lapped-out surfaces of the fixing elements 13, 14, the frame 11 is installed flatly-parallel relative to the base surface 5 of the ruler 1 in such a way that the air clearance between the armature 9 and the core 6 of each pick-up 8 is equal in the initial position to 0.01 mm. The frame 11 is supported in the initial position by means of cylindrical springs 15, 16 one end of the springs being fastened to the base surface 5 of the ruler 1, while the other end of each spring is fastened to the base of the cylindrical guides 17. The base of each guide 17 is connected by means of a spherical pivot 18 to the upper butt surface of the frame 11. The free end of each guide 17 can move vertically in the range of 13–15 mm in a through cylindrical slot of the base ruler 1. To accomplish contact between the hard-alloy pivots 12 and the tested portions of the working surface of the lap 4 in the process of measuring, use is made of a pneumatic system of loading, comprising a source 19 of compressed air, an electromagnetic controlable valve 20 and a sealed chamber of the present device. The rectangular frame 11 with the stretched-out flexible wrapper 10 serves as the bottom of the sealed chamber. The side walls 21 of the chamber are fabricated from corrugated rubber. All the joints of the side wall 21 of the chamber and the base surface 5 of the ruler 1 and the upper butt surface of the chamber are carefully glued. The pressure of 2 + 3 kgf/cm$^2$ is selected experimentally, ensuring tight adherence of the lapped-out surfaces of the hard-alloy pivots 12 to the working surface of the lap 4 within a range of linear values of the wear of the working surface of the lap 4 within 0.02 – 1.5 mm. The signals from each pick-up 8 proceed to the input of a special electronic block consisting of a stabilised power source 22, filtering amplifiers 23 per each pick-up 8, an analog-code converter 24, a digital register 25 of the driving oscillator 26, an illumination panel 27 and a control circuit 28.

To clean the tested portion of the working surface of the lap 4 from the abrasive suspension, the device is equipped with a special metal brushes-scrapers 29 located radially along the base ruler 1.

The device of the invention operates in the following manner:

A. Preparing the Device for Operation (Adjustment of the Device)

The device for testing the profile of the working surface of the lap 4 is installed in three points on the stand 30 of the finishing tool (not shown) so that the base ruler 1 of the device passes through the centre of the lap 4 and is arranged between the regular rings 31 of the tool. The base ruler 1 is extended parallel to the initial surface of the lap 4 by means of the adjustable supports 2, 3.

The rectangular frame 11 with the flexible wrapper 10 has in the initial position the fixing elements 13, 14 installed on the base surface 5 of the ruler 1. Thereafter, the adjustable valve 20 is actuated to supply compressed air to the sealed chamber. The frame 11 with the flexible wrapper 10 is lowered until the hard-alloy pivots 12 are brought into contact with the initial surface of the lap 4 (the lap 4 is immobile). Thereafter, the pick-ups are actuated, and the operator writes down the value of the signal on the output of each filtering amplifier 23 of each pick up 8. The drive for rotating the lap 4 is then switched on, and by means of adjusting the filtering amplifier 23 of each pick-up 8, the interference caused by beatings of the spindle 32 of the lap is eliminated. Thereafter, abrasive suspension is supplied to the lap 4. Interference is caused by the availability of sludge and grains of abrasive left by the brushes 29 on the surface of the lap 4. This completes the preparation of the device for work, the stage being called the adjustment of the device. The adjustment of the device is effected once when installing a new lap.

B. Measurement

The process of testing the shape of the working surface of the lap 4 is accomplished in the following manner: the driving oscillator 26 providing control pulses is switched on so as to provide transient issue stroke pulses to the control circuit 28 and to synchronize the operation of the device in the working mode. The control circuit 28 issues a control pulse for switching on the control valve 20 to supply compressed air under pressure to the sealed chamber. Then a pause of 40 msec. is initiated to complete the transient processes in the mechanical system of the device. Thereafter, the control circuit 28 successively connects each channel (pick-up 8) to the analog-code converter 24. The signal from each pick-up 8 passing through the filtering amplifier 23 and the analog-code converter 24, proceeds to the digital register 25 and is written down there in the appropriate digits. After completing the record of information in the digit register 25 obtained from all the pick-ups, the control circuit 28 switches off the control valve 20. The device returns to the initial position. In this case, the record made in the digit register 25 is retained until the next measurement. The operator can obtain information on the radial profile, of the working surface of the lap 4 by switching on the illumination panel 27 whereon depicted to scale is the deviation of the radial profile of the lap 4 from rectilinear arrangement approximated by five points.

The proposed device can be applied for testing any shape of surface. In this case, the contours of the base surface of the ruler should correspond to the contours of the tested surface, and the base surface must have the shape that corresponds to the ideal tested surface. The arrangement of the tested points (pick-ups) corresponds to the accepted conditions of approximating the macrorelief of the surface.

Though one example of an embodiment of the present invention is given in the description for a particular case of measuring the wear of a finishing lap, the description serves only as an illustration without limiting the scope of claims as defined hereinafter.

What is claimed is:

1. A device for measuring the profile of the surface of a movably mounted component both during movement thereof and while said component is stationary, comprising: a plurality of measuring elements for determining linear dimensions disposed displaced from and in alignment with predetermined points of the surface of the component to be tested; a movably mounted flexible wrapper disposed between said measuring elements and the surface of the component to be tested, said flexible wrapper having a plurality of contacting members for contacting the surface to be tested at said predetermined points at a moment of measurement, each of said contacting members being associated with one of said measuring elements; means for bringing the contacting members of said wrapper from an initial position thereof into contact with the surface to be tested at the moment of measurement so that each one of said measuring elements determines the distance at the moment of measurement from a reference plane fixed with respect to said surface to be tested to the associated one of said contacting members of said flexible wrapper.

2. A device as set forth in claim 1 wherein said flexible wrapper comprises a resilient band located over the surface to be tested and having said contacting members disposed therealong, each one of said measuring elements including a sensitive induction pick-up unit responsive to the positions of said contacting member on the surface being tested.

3. A device as set forth in claim 1 wherein each one of said measuring elements includes a sensitive induction pick-up unit for producing a measuring signal representative of the position of said contacting members on the surface being tested, and a mobile member the position of which with respect to said sensitive pick-up unit determines the value of said measuring signal, said mobile member being connected to said flexible wrapper for movement therewith.

4. A device as set forth in claim 3 wherein means is provided for pressing said flexible wrapper into engagement with the surface of the component to be tested at the moment of measurement and for returning said flexible wrapper to said initial position thereafter.

5. A device as claimed in claim 4 wherein said flexible wrapper forms the elastic bottom of an hermetically enclosed expandable chamber having an inlet opening coupled to a compressible medium whereby said flexible wrapper with said contacting members is firmly held against the surface of the component to be tested when the compressible medium is permitted to fill said chamber through the inlet thereof.

6. A device as set forth in claim 5 wherein said flexible wrapper is formed from a rubber band which, when stretched, has lengths of brass foil firmly attached to both sides thereof.

* * * * *